United States Patent

Ebata

[11] Patent Number: 6,072,646
[45] Date of Patent: Jun. 6, 2000

[54] RECORDING APPARATUS, RECORDING/REPRODUCING APPARATUS AND RECORDING METHOD FOR DIGITAL SIGNALS

[75] Inventor: Kazuyoshi Ebata, Tokyo, Japan

[73] Assignee: Sony Corporation, Tokyo, Japan

[21] Appl. No.: 08/826,518

[22] Filed: Apr. 3, 1997

[30] Foreign Application Priority Data

Apr. 8, 1996 [JP] Japan .................................. 08-085302

[51] Int. Cl.[7] ....................................................... G11B 5/02
[52] U.S. Cl. .................................. 360/22; 360/32; 360/48
[58] Field of Search ................................. 360/22, 48, 47, 360/60, 32

[56] References Cited

U.S. PATENT DOCUMENTS

| | | | |
|---|---|---|---|
| 4,622,598 | 11/1986 | Doi et al. ................................. | 360/22 |
| 5,065,260 | 11/1991 | Lagadec ................................... | 360/32 |
| 5,311,372 | 5/1994 | Matsumi et al. ...................... | 360/22 X |
| 5,384,665 | 1/1995 | Ohkuma ................................. | 360/22 |
| 5,424,879 | 6/1995 | Yamada et al. ........................ | 360/22 |
| 5,506,687 | 4/1996 | Gillard et al. ....................... | 360/22 X |

*Primary Examiner*—Andrew L. Sniezek
*Attorney, Agent, or Firm*—Jay A. Maioli

[57] ABSTRACT

A recording/reproducing method for recording/reproducing digital signals on plural slanted tracks of a tape-shaped recording medium, in which, even if some of the slanted tracks are erased due to junction recording or after-recording, the signals can be reproduced satisfactorily. The input digital signals are divided into upper order bits and lower order bits, and the upper order bits are further divided into upper order side bits and lower order side bits. The data corresponding to the upper order bits, the data corresponding to the upper order side bits of the lower order bits and the data corresponding to the lower order side bits of the lower order bits are recorded in respective different slanted tracks.

6 Claims, 6 Drawing Sheets

RECORDING APPARATUS, RECORDING/REPRODUCING APPARATUS AND RECORDING METHOD FOR DIGITAL SIGNALS

BACKGROUND OF THE INVENTION

1. Field of the Invention

This invention relates to a recording apparatus, a recording and/or reproducing apparatus and a recording method for digital signals in which digital signals are recorded on plural slanted tracks of a tape-shaped recording medium.

2. Description of the Related Art

In a system for recording digital signals to a high density on the tape-shaped recording medium, such as a digital audio tape recorder (DAT), a head 100 is adapted to scan a magnetic tape 101 as a tape-shaped recording medium in an oblique direction A2 relative to the running direction A1 for recording/reproduction, as shown in FIG. 1.

Therefore, in such system, plural slanted tracks are formed for extending obliquely relative to the running direction A1 of the magnetic tape 101. In a so-called azimuth-beta recording system in which no guard band is provided, a track width t2 on the magnetic tape 101 is narrower than a head width t1. That is, during recording, a posteriorly recorded slanted track is overlapped with a portion of a neighboring previously recorded slanted track.

With such system, first-time recording can be done unobjectionably. However, if new digital signals are overwritten on previously recorded digital signals, for junction recording or after-recording, a newly recorded slanted track 102a is partially overlapped with a previously recorded slanted track 102b thus erasing a portion of the previously recorded slanted track 102b.

Specifically, if, after recording is performed in an editing operation with tracking control, the previously recorded slanted track is erased by approximately 0.25 track pitch by the overwriting slanted track during punch-in operation, while the previously recorded slanted track is erased by approximately 0.5 track pitch by the overwriting slanted track during the punch-out operation. If the previously recorded slanted track is erased by as much as 0.5 track pitch, there is produced an error that cannot be corrected during reproduction.

Thus, in a system employing a rotary head for recording digital signals to a high density on the tape-shaped recording medium, there is presented a problem that a previously recorded slanted track is partially erased at the time of junction recording or after-recording.

This problem is thought to be inherent in the azimuth beta recording system in which the track width is narrower than the head width. Owing to this problem, there is placed a limitation to using the DAT, which is an inexpensive medium for household use, in an professional application entailing high signal quality.

Meanwhile, in a system typified by DAT, input digital signals are divided into even-numbered data and odd-numbered data and interleaved and the interleaved data are distributed in plural slanted tracks for recording, for thereby copping with burst errors ascribable to dropout in the magnetic tape as the tape-shaped recording medium. However, such interleaving has no effect if the error rate of some slanted tracks in their entirety is worsened to render it difficult to obtain the playback output.

As a system for coping with this problem, there is proposed in a senior Japanese Laid-Open Patent No.08102150 a DAT of the present Assignee wherein data is divided into upper order bits and lower order bits and in which the lower order bits are recorded on the slanted track susceptible to dropout by junction recording or after-recording. With such DAT, if signals of some slanted tracks are lost by dropout under the effect of the junction recording or after-recording, the upper bits are reproduced normally, thus realizing a satisfactory playback output.

However, if this DAT is applied as a DAT carrying out recording and/or reproduction at double the usual recording and/or reproducing speed (double-speed DAT), it is upper 16 bits of the input digital signal that are handled as upper bits. Therefore, if the original audio data is 24-bit data, and if part of the slanted track is erased due to junction recording or after-recording, the lower 8 bits of the audio data are lost by dropout. Thus, even the DAT proposed in the above referenced patent application is insufficient for recording digital signals exceeding 16 bits.

If only lower order bits are recorded in specified slanted tracks, it may occur that, in reproducing the magnetic tape with a relative movement speed between the magnetic tape and the head different from the usual playback speed, that is in reproducing the tape with variable playback speed, the playback sound cannot be produced. For example, if, during variable speed reproduction, tape running control should fail to operate normally and the head moving position on the magnetic tape deviates from the design position, such that the playback signal is produced from the slanted track on which only the lower bits are recorded, the playback sound cannot be produced due to lack of the upper bits in the slanted track. That is, the DAT proposed in the senior patent application presents problems especially in connection with variable speed reproduction.

SUMMARY OF THE INVENTION

It is therefore an object of the present invention to provide a method and apparatus for recording digital signals on a tape-shaped recording medium in which the digital signals are recorded on the tape-shaped recording medium in such a manner that, even if some slanted tracks are erased in their entirety under the effect of the junction recording or after-recording, signals can be reproduced satisfactorily.

It is another object of the present invention to provide a method for recording digital signals on a tape-shaped recording medium in which, if tape running control fails to operate properly during variable speed reproduction, signals can be reproduced satisfactorily from the tape-shaped recording medium.

In one aspect, the present invention provides a digital signal recording apparatus employing a tape-shaped recording medium having formed thereon a plurality of slanted tracks corresponding to information signals, in which the apparatus includes a signal processing unit for separating digital signals into a first portion and a second portion and for separating the second portion into upper order bits of the second portion and into lower order bits of the second portion, and a recording unit for recording an output of the signal processing unit on the tape-shaped recording medium. The recording unit has a rotary drum and at least one head mounted on the rotary drum. The recording unit causes the head to record the first portion, the upper order bits of the second portion and the lower order bits of the second portion from the signal processing unit as different tracks.

In another aspect, the present invention provides a digital signal recording apparatus employing a tape-shaped recording medium having formed thereon a plurality of slanted tracks corresponding to information signals of two channels, in which the apparatus includes a signal processing unit for separating one of the two channels of the digital signals into first upper order bits and first lower order bits, separating the other channel of the digital signals into second upper order bits and second lower order bits, and for separating the first lower order bits and the second lower order bits into respective upper order side bits and lower order side bits, and a recording unit for recording an output of the signal processing unit on the tape-shaped recording medium. The recording unit has a rotary drum and at least one head mounted on the rotary drum, and the recording unit causes the head to record the first and second upper order bits, the upper order side bits of the first lower order bits, upper order side bits of the second lower order bits, lower order side bits of the first lower order bits and lower order side bits of the second lower order bits from the signal processing unit as different tracks.

In still another aspect, the present invention provides a digital signal recording/reproducing apparatus employing a tape-shaped recording medium having formed thereon a plurality of slanted tracks corresponding to information signals of two channels, in which the apparatus includes a first signal processing unit for separating one of the two channels of the digital signals into first upper order bits and first lower order bits, separating the other channel of the digital signals into second upper order bits and second lower order bits, and for separating the first lower order bits and the second lower order bits into respective upper order side bits and lower order side bits, and a recording unit for recording an output of the first signal processing unit on the tape-shaped recording medium. The recording unit has a rotary drum and at least one head mounted on the rotary drum, and causes the head to record the first and second upper order bits, the upper order side bits of the first lower order bits, upper order side bits of the second lower order bits, lower order side bits of the first lower order bits and lower order side bits of the second lower order bits from the first signal processing unit as different tracks. The apparatus also includes a second signal processing unit for re-arraying the upper order side bits of the first lower order bits, the upper order side bits of the second lower order bits, lower order side bits of the first lower order bits and the lower order side bits of the second lower order bits in the signal read out by the head for the first lower order bits and for the second lower order bits, and for outputting the re-arrayed bits.

In yet another aspect, the present invention provides a digital signal recording method employing a tape-shaped recording medium having formed thereon a plurality of slanted tracks corresponding to information signals of two channels. The method includes separating one of the two channels of the digital signals into first upper order bits and first lower order bits and for separating the other channel of the digital signals into second upper order bits and second lower order bits, separating the first lower order bits and the second lower order bits into respective upper order side bits and lower order side bits, and recording, by at least one head mounted on a rotary drum, the first and second upper order bits, the upper order side bits of the first lower order bits, upper order side bits of the second lower order bits, lower order side bits of the first lower order bits and lower order side bits of the second lower order bits from the signal processing unit as different tracks.

DESCRIPTION OF THE PREFERRED EMBODIMENTS

Figure 1:
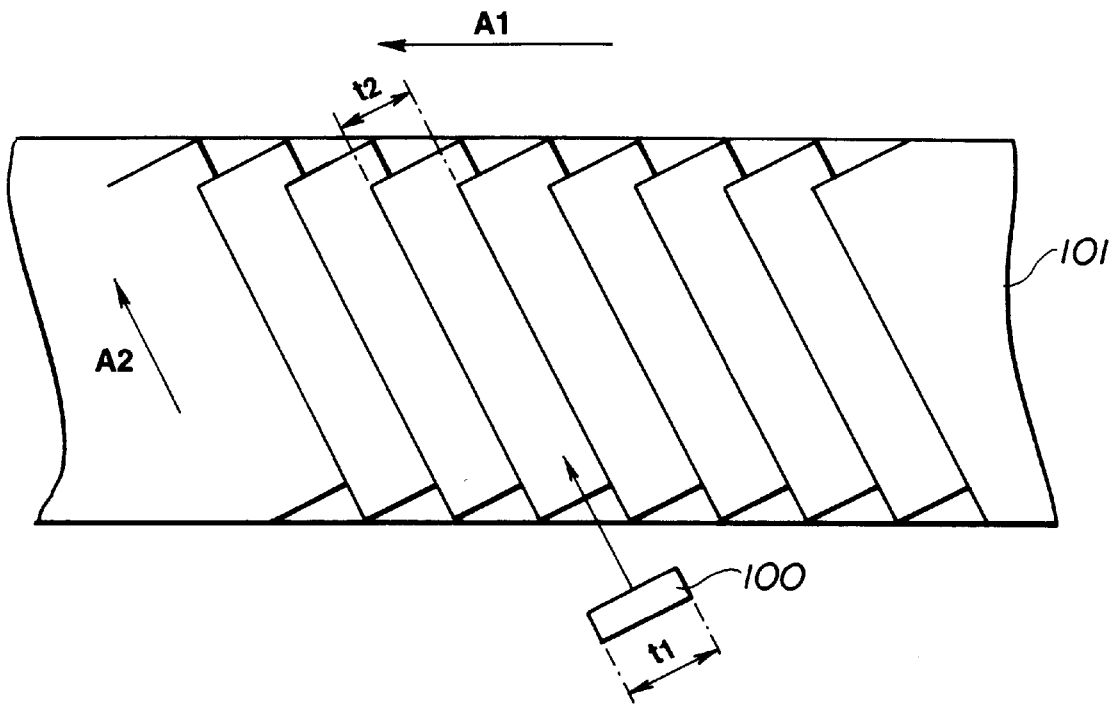
FIG. 1 is a schematic view showing a recording format by a conventional recording apparatus.
Figure 2:
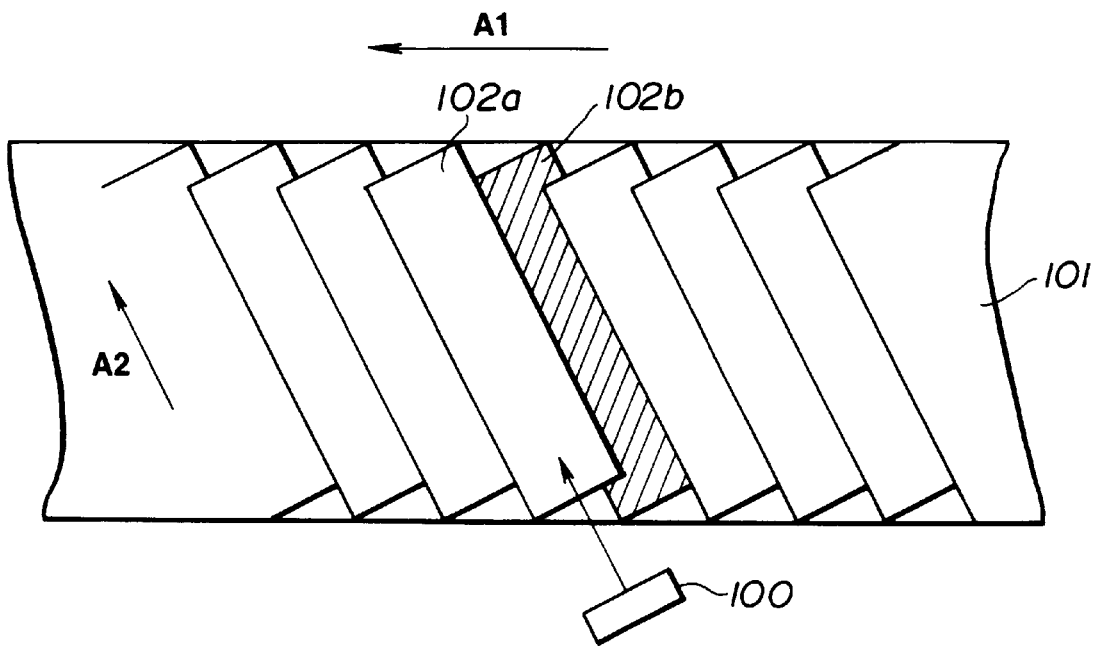
FIG. 2 is a schematic view showing the manner in which a part of a slanted track is lost due to junction recording or after-recording.

Referring to the drawings, an example in which the present invention is applied to a DAT carrying out recording/reproduction at double the speed of usual recording/reproducing speed (double-speed DAT) is explained. The double-speed DAT, which is a recording/reproducing system in which audio signals are recorded/reproduced as 16-bit-per-sample audio data, can realize the sound quality which is superior to that realized with the conventional DAT designed for recording/reproducing audio signals as 16-bit-per-sample audio data. It should be noted that the present invention is not limited to the following example of execution and may be optionally modified as to, for example, its structure without departing from the purport of the invention.

The present invention is directed to a recording/reproducing apparatus having both the function of a recording apparatus recording audio signals as digital signal on plural slanted tracks of a magnetic tape as a tape-shaped recording medium for magnetic recording of information signals and the function of a reproducing apparatus for reproducing audio signals recorded as digital signals on the plural slanted tracks of the magnetic tape.

Figure 3:
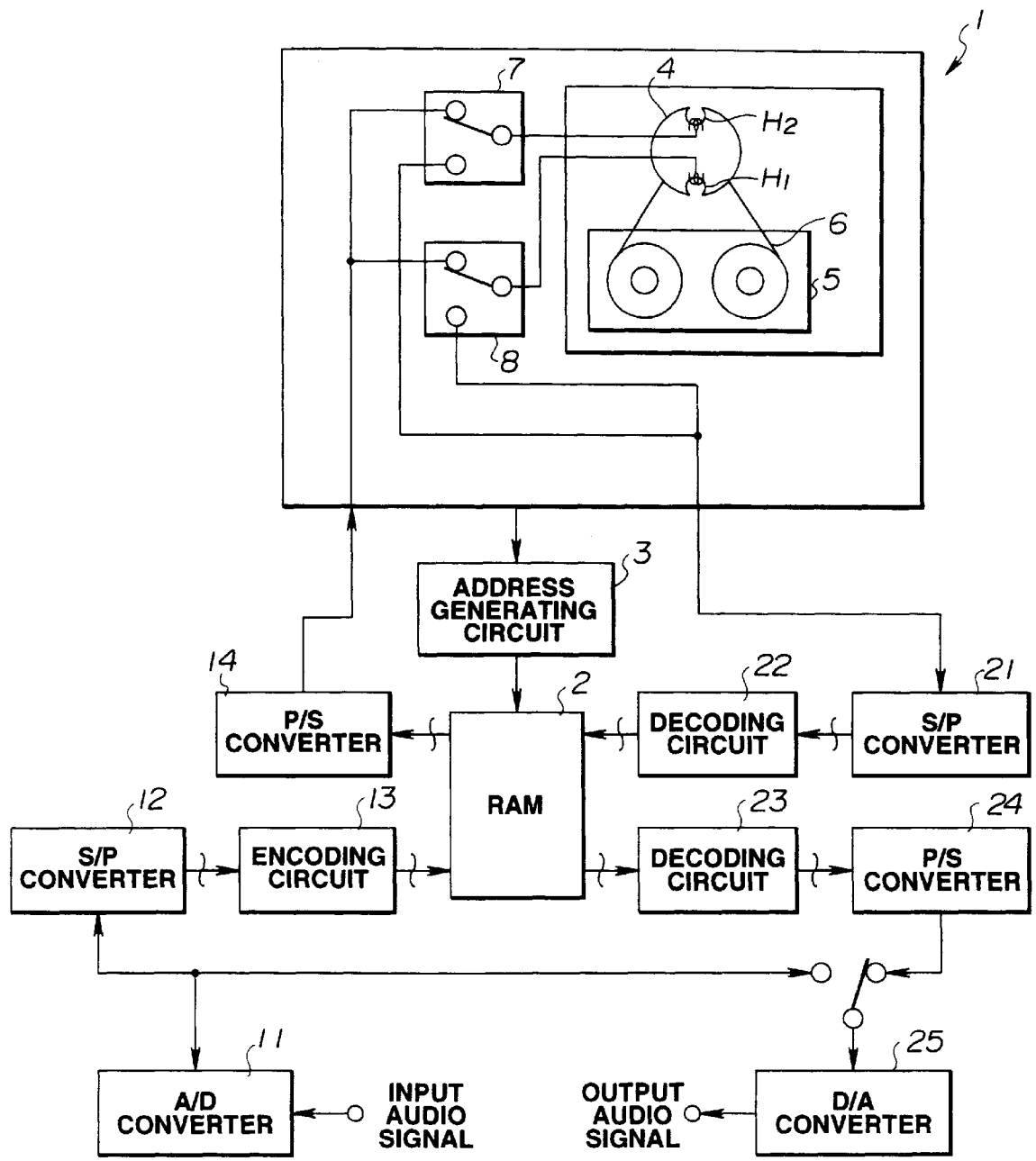
FIG. 3 is a block diagram showing an illustrative structure of a recording/reproducing apparatus embodying the present invention.

Referring to FIG. 3, the recording/reproducing apparatus includes a recording/reproducing unit 1 for recording/reproducing digital signals to a magnetic tape 6 accommodated within a tape cassette 5, a random access memory (RAM) 2 for temporarily storing audio data and an address generating circuit 3 for generating readout addresses and write addresses of the RAM 2.

The recording/reproducing unit 1 records/reproduces data in accordance with an azimuth beta recording system, that is a system free of guard bands, by scanning magnetic heads H1, H2 mounted on a rotary drum 4 in an oblique direction relative to the running direction of a magnetic tape 6. The width of each of the magnetic heads H1, H2 of the recording/reproducing unit 1 is selected to be broader than the width of the slanted tracks formed on the magnetic tape. The recording/reproducing unit 1 is connected to the address generating circuit 3 so that the interleaving period information or the sampling word period information is supplied to the address generating circuit 3 during recording/reproduction. The address generating circuit 3 is connected to the RAM 2 and generates the readout address or write address based on the interleaving period information or the sampling word period information supplied from the recording/reproducing unit 1 for thereby controlling the readout address and the write address of the RAM 2. The signal format is elucidated in, for example, the U.S. Pat. No. 4,739,420.

The recording/reproducing apparatus includes, as a recording circuit, an analog to digital (A/D) converter 11 for converting input analog audio signals into digital signals, and a first serial to parallel (S/P) converter 12 for converting the audio data from the A/D converter 11 into parallel data. The recording/reproducing apparatus also includes, as the recording circuit, an encoding circuit 13 for encoding the audio data from the first S/P circuit 12 for writing the encoded audio data in the RAM 2, and a first parallel to serial (P/S) converter 14 for converting the audio data from the RAM 2 into serial data.

The recording/reproducing apparatus includes, as a reproducing circuit, a second S/P circuit 21 for converting the audio data into parallel data, a first decoding circuit 22 for decoding the audio data from the second S/P circuit 21 for writing the decoded audio data in the RAM 2, and a second decoding circuit 23 for decoding the audio data from the RAM 2. The recording/reproducing apparatus also includes, as the reproducing circuit, a second P/S converter 24 for converting the audio data from the second decoding circuit 23 into serial data and a digital to analog (D/A) converter 25 for converting the audio data from the second P/S converter 24 into analog audio signals.

When recording audio signals on a magnetic tape by the above-described recording/reproducing apparatus, analog audio signals of L and R channels are first supplied to the A/D converter 11 so as to be thereby converted into digital signals. The number of quantization bits is 24. That is, the A/D converter 11 routes the 24-bit-per-sample L-channel audio data and the 24-bit-per-sample R-channel audio data to the first S/P converter 12. If the input signals are digital signals, these digital signals can be routed directly to the first S/P converter 12 without interposition of the A/D converter 11.

Next, the audio data from the A/D converter 11 are converted by the first S/P converter 12 into parallel data. The parallel data from the first S/P converter 12 are processed by the encoding circuit 13 with pre-set error correction processing and with encoding by bit operation as later explained. The encoded audio data is written in the RAM 2. The encoded audio data is written in two addresses of the RAM 2 at a usual write speed in accordance with the write address generated by the address generating circuit 3 in meeting with the interleaving period and the sampling word period employed in the recording/reproducing unit 1.

The audio data in the RAM 2 is then read at a speed twice the usual readout speed, that is at a double speed, in accordance with the write address generated by the address generating circuit 3 in meeting with the interleaving period and the sampling word period employed in the recording/reproducing unit 1 so as to be converted into serial data by the first P/S converter 14. The serial data from the first P/S converter 14 is supplied to the magnetic head H1 or to the magnetic head H2 via changeover switches 7 and 8 used for switching between the heads H1 and H2 so as to be written or recorded on the magnetic tape 6 by these magnetic heads H1, H2 at a speed twice the usual recording speed, that is at a double speed.

When recording the audio signals on the magnetic tape, the encoding circuit 13 separates the parallel data from the first S/P converter 12 into upper order bits and lower order bits, while also separating the separated lower order bits into upper order side bits, more precisely, upper lower order bits, and into lower order side bits, more precisely, lower lower order bits. When separating the parallel data from the first S/P converter 12, the encoding circuit 13 appends a discrimination bit to the upper order bits and to the lower order bits for discriminating the upper order bits and the lower order bits from each other. Also, when separating the lower order bits into upper lower order bits and lower lower order bits, the encoding circuit 13 duplicates part of the upper order bits into the lower lower order bits.

Figure 4:
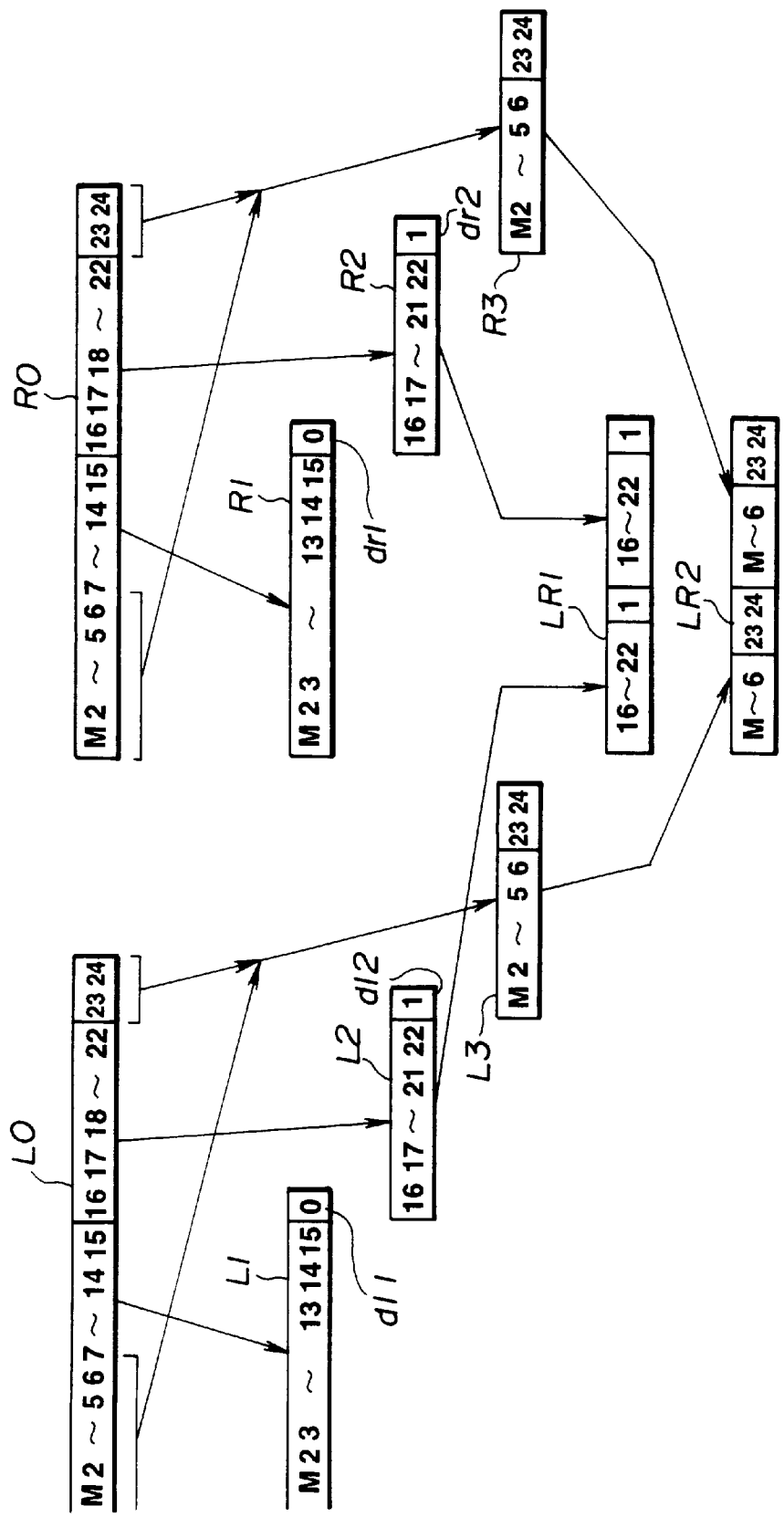
FIG. 4 shows the manner of an encoding operation by an encoding circuit.

The encoding in the encoding circuit 13 described above is now explained in detail as shown in FIG. 4.

When fed with 24-bit-per-sample L-channel audio data L0, the encoding circuit 13 divides the 24-bit audio data L0 into upper order bits L1 made up of 15 bits from the MSB to 15SB and into lower order bits of from 16SB to 24SB, and additionally divides the lower order bits into upper lower bits L2 made up upper order side seven bits from 16SB to 22SB and lower lower two bits L3 made up of lower order side bits from 23SB to 24SB. At this time, the encoding circuit 13 appends 0 and 1 to the trailing ends of the upper order bits L1 and to the upper lower order bits L2, respectively, as discrimination bits dl1, dl2 for discrimination of the upper order bits and the lower order bits. The encoding circuit 13 duplicates the six bits from MSB to 6SB and appends these six bits to the former half of the lower lower bits L3. The encoding circuit 13 writes the upper order bits L1 in the RAM 2 in accordance with the write address generated by the address generating circuit 3.

When fed with 24-bit-per-sample R-channel audio data R0, the encoding circuit 13 similarly divides the 24-bit audio data R0 into upper order bits R1 made up of 15 bits from the MSB to 15SB and lower order bits from 16SB to 24SB, and additionally divides the lower order bits into upper lower bits R2 made up of upper order seven bits from 16SB to 22SB and lower lower two bits R3 from 23SB to 24SB. At this time, the encoding circuit 13 appends 0 and 1 to the trailing ends of the upper order bits R1 and to the trailing ends of the upper lower order bits R2, respectively, as discrimination bits dr1, dr2 for discrimination of the upper order bits and the lower order bits. The encoding circuit 13 duplicates the six bits from MSB to 6SB and appends these six bits as the former part of the lower lower bits R3. The encoding circuit 13 writes the upper order bits R1 in the RAM 2 in accordance with the write address generated by the address generating circuit 3.

The encoding circuit 13 connects the upper lower bits L2 of the L-channel to the upper lower bits R2 of the R-channel to form upper lower bits LR1 of the L and R channels. The encoding circuit 13 writes the upper lower bits LR1 in the RAM 2 in accordance with the write address generated by the address generating circuit 3.

The encoding circuit 13 connects the lower lower bits L2 of the L-channel to the lower lower bits R2 of the R-channel to form lower lower bits LR2 of the L and R channels. The encoding circuit 13 writes the lower lower bits LR2 in the RAM 2 in accordance with the write address generated by the address generating circuit 3.

By the above processing, the upper order bits L1 of the L-channel, upper bits R1 of the R-channel, upper lower bits LR1 of the L and R channels and the lower lower bits LR2 of the L and R channels are written in pre-set addresses of the RAM 2.

The audio data, encoded and written in the RAM 2 as described above, is read out from the RAM 2 based on the readout addresses generated by the address generating circuit 3 so as to be written on the magnetic tape by the recording/reproducing unit 1. At this time, the recording/reproducing unit 1 records data processed with the above-described bit processing and error correction processing by the encoding circuit 13, that is data corresponding to the upper order bits L1 of the L-channel, data corresponding to the upper bits R1 of the R-channel, data corresponding to the upper lower bits LR1 of the L and R channels and data corresponding to the lower lower bits LR2 of the L and R channels, on respective different slanted tracks, whilst the changeover switches 7, 8 switch between the magnetic heads H1 and H2.

The operation of recording these data on the different slanted tracks is now explained in detail.

The audio data, encoded as described above, is stored in the RAM 2. The address generating circuit 3 generates the readout addresses, based on the interleaving period information and the sampling word period information from the recording/reproducing unit 1, so that the audio data stored in the RAM 2 will be read out on the interleaving block basis. This causes the audio data stored in the RAM 2 to be read out from the RAM 2 on the interleaving block basis.

Specifically, a set of data Lro2, corresponding to lower lower bits of the odd-numbered L and R channels LR2, a set of data Lre2, corresponding to lower lower bits of the even-numbered L and R channels LR2, a set of data Lro1, corresponding to upper lower bits of the odd-numbered L and R channels LR1, a set of data Lre1, corresponding to upper lower bits of the even-numbered L and R channels LR1, a set of data Lo1 corresponding to the upper order bits L1 of the odd-numbered L-channel, a set of data Re1 corresponding to the upper order bits R1 of the even-numbered L-channel, a set of data Ro1 corresponding to the upper order bits R1 of the odd-numbered R-channel, and a set of data Le1 corresponding to the upper order bits L1 of the even-numbered L-channel, are read out in meeting with the interleaving period or the sampling word period from the RAM 2.

Figure 5:
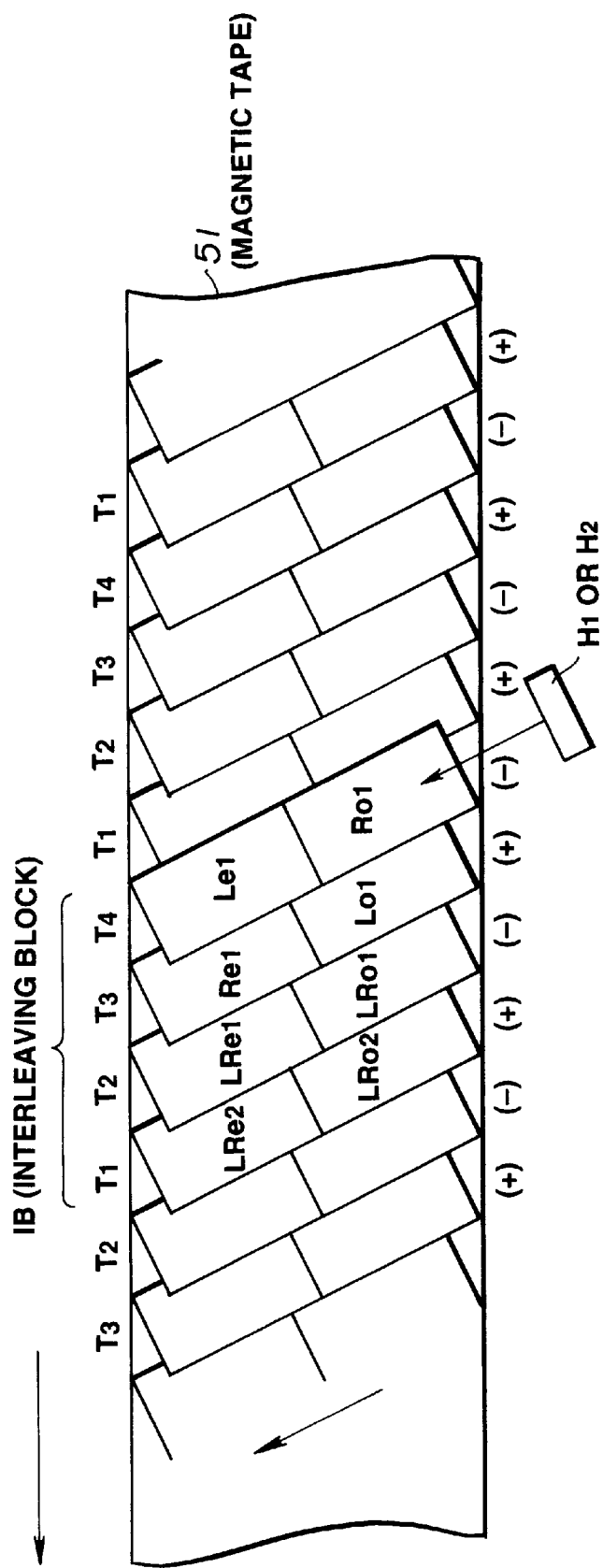
FIG. 5 is a schematic view showing a recording format on the recording tape.

The data sets, thus read out under the above-described address control from the RAM 2, are sent by the first P/S converter 14 into serial data and thence supplied to the recording/reproducing unit 1 which then records these data sets on a magnetic tape 51 by the magnetic head Hi or H2 every interleaving block as shown in FIG. 5. The interleaving block is a block resulting from division of the data in terms of an interleaving unit. An interleaving block IB is recorded on a first slanted track T1 having a minus azimuth, a second slanted track T2, having a plus azimuth, a third slanted track T3, having a minus azimuth and on a fourth slanted track T4 having a plus azimuth.

That is, the magnetic head H1 or H2 of the recording/reproducing unit 1 records the data set Lro2, corresponding to the lower lower bits of the odd-numbered L and R channels LR2, in the former half of the first slanted track T1, while recording the data set Lre2, corresponding to lower lower bits of the even-numbered L and R channels LR2, in the latter half of the first slanted track T2. Also, the magnetic head H1 or H2 of the recording/reproducing unit 1 records the data set Lro1, corresponding to the upper lower bits LR1 of the odd-numbered L and R channels LR1, in the former half of the second slanted track T2, while recording the data set Lre1, corresponding to upper lower bits of the even-numbered L and R channels LR1, in the latter half of the second slanted track T2.

The magnetic head H1 or H2 of the recording/reproducing unit 1 records the data set Lo1 corresponding to the upper order bits L1 of the odd-numbered L-channel in the former half of the third slanted track T3, while recording the data set Re1 corresponding to the upper order bits R1 of the even-numbered R-channel in the latter half of the third slanted track T3. The magnetic head H1 or H2 of the recording/reproducing unit 1 records the data set Ro1 corresponding to the upper order bits R1 of the odd-numbered R-channel in the former half of the fourth slanted track T4, while recording the data set Le1 corresponding to the upper order bits L1 of the even-numbered L-channel in the latter half of the fourth slanted track T4.

When the interleaving is completed by the first to fourth slanted tracks T1, T2, T3 and T4, the slanted track, erased on junction recording or after-recording, is the first track T1 positioned at the leading end of the first to fourth slanted tracks T1 to T4. In the present embodiment, data recorded on the first slanted track T1 is that corresponding to the lower lower bits LR2 including the lowermost two bits of the original 24-bit audio signals. Thus, even if the playback signals become unable to be obtained from the first slanted track T1 as a result of junction recording or recording, it is only the information of the lowermost two bits of the original 24-bit audio data that is lost, while the upper 22-bit information is maintained. Therefore, in the present embodiment, optimum playback signals can be produced even if part of the slanted track is erased due to junction recording or after-recording.

The operation for reproducing audio data from the magnetic tape by the above-described recording/reproducing apparatus is explained.

For reproducing audio data from the magnetic tape, the audio data is reproduced by the magnetic head H1 or H2 of the recording/reproducing unit 1 at a speed twice the usual read-out speed, that is at the double speed. The audio data, thus reproduced by the magnetic head H1 or H2 of the recording/reproducing unit 1, is converted by the second S/P converter 21 into parallel data. The parallel data from the second S/P converter 21 is decoded by the first decoding circuit 21 with pre-set error correction processing or bit-processing as later explained. The decoded audio data is written in the RAM 2. The decoded audio data is written in the RAM 2 at a speed twice the usual read-out speed, that is at the double speed, in accordance with the write address generated by the address generating circuit 3 in keeping with the interleaving period and the sampling word period used in the recording/reproducing unit 1.

The audio data in the RAM 2 is read out from two addresses in the RAM 2 at the usual readout speed in accordance with the readout addresses generated by the address generating circuit 3 in keeping with the interleaving period and the sampling word period used in the recording/reproducing unit 1. The audio data from the second decoding circuit 23 is then converted into serial data. The audio data from the second P/S converter 24 is converted by the D/A converter 25 into analog audio signals so as to be outputted as audio signals of the two channels (L and R channels). If the output signals can be left as digital signals, it suffices to directly output the digital signals from the second P/S converter 24.

Figure 6:
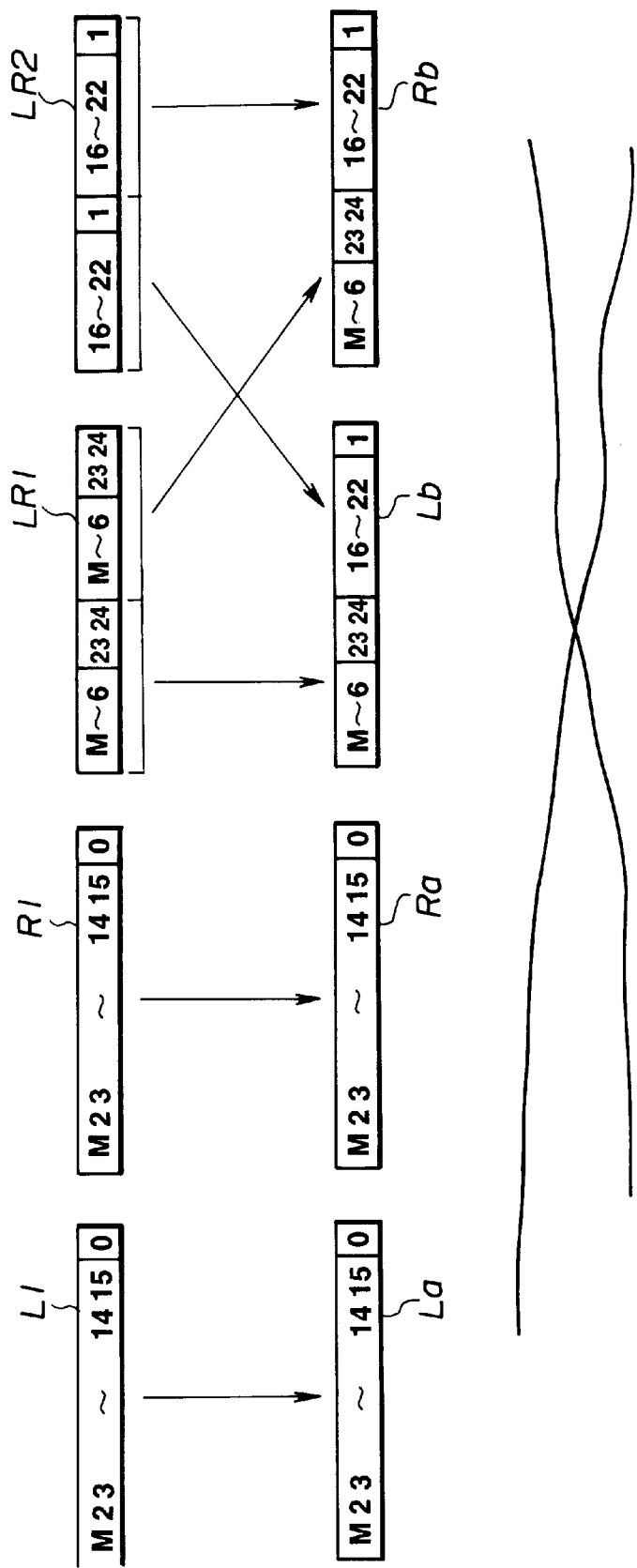
FIG. 6 shows the manner of a decoding operation by a first decoding circuit.

When reproducing the audio signals from the magnetic tape, the first decoding circuit 22 performs decoding as shown in FIG. 6.

Specifically, the first decoding circuit 22 directly outputs the upper order bits L1 of the of the L-channel as upper order bits La of the L-channel, while outputting the upper order bits R1 of the R-channel as upper order bits Ra of the R-channel. The first decoding circuit 22 interchanges part of the upper lower bits LR1 of the L channel and the R channel and part of the lower lower bits LR2 of the L channel and the R channel and outputs the interchanged results as lower order bits Lb of the L-channel and as the lower order bits Rb of the R-channel.

That is, the first decoding circuit 22 takes out upper order 16 bits of the upper lower bits LR1 of the L-channel and the R-channel and upper order 16 bits of the lower lower bits LR2 of the L-channel and the R-channel and combines them together to form lower bits Lb of the L-channel which are outputted. The first decoding circuit 22 also takes out lower order 16 bits of the upper lower bits LR1 of the L-channel and the R-channel and lower order 16 bits of the lower lower bits LR2 of the L-channel and the R-channel and combines them together to form lower bits Rb of the R-channel which are outputted.

Figure 7:
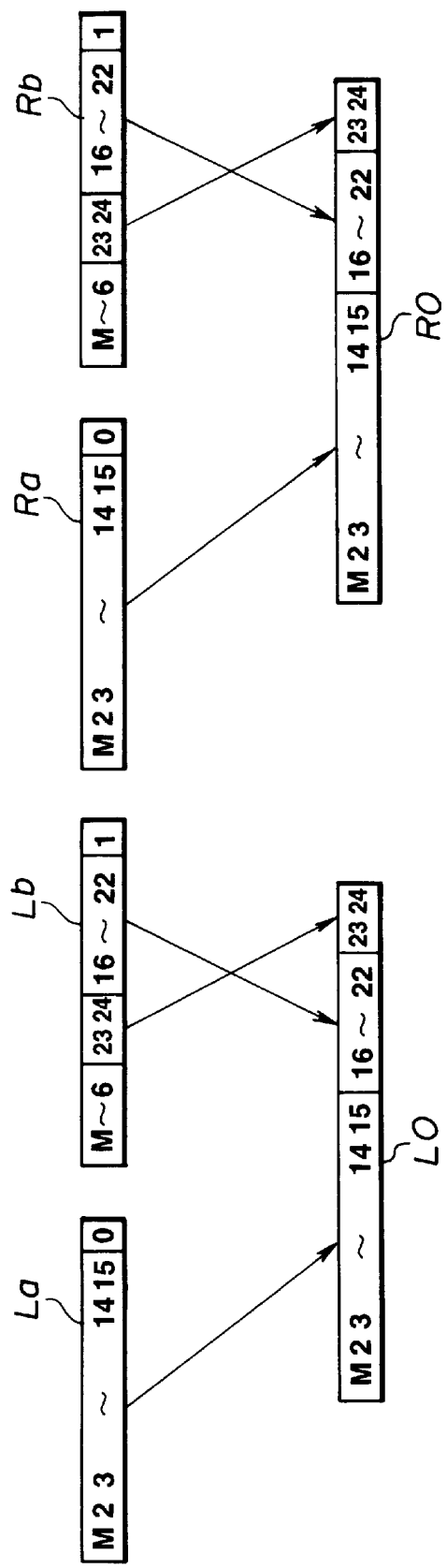
FIG. 7 shows the manner of a decoding operation by a second decoding circuit.

On the other hand, the second decoding circuit 23 performs decoding as shown in FIG. 7.

That is, the second decoding circuit 23 reproduces 24 bits of audio data of the L-channel L0 from the upper bits La of the L-channel and the lower bits Lb of the L-channel, while reproducing 24 bits of audio data of the R-channel R0 from the upper bits Ra of the R-channel and the lower bits Rb of the R-channel.

Specifically, the second decoding circuit 23 takes out bits from MSB to 15SB from the upper order bits Ra of the R-channel, while taking out bits 16SB to 22SB, 23SB and 24SB, from the lower order bits Rb of the R-channel. The bits from MSB to 15SB and 16SB to 22SB, 23SB and 24SB make up 24 bits of the audio data. The second decoding circuit 23 combines these bits to form 24-bit audio data R0 of the R-channel to output the data R0. Similarly, the second decoding circuit 23 takes out bits from MSB to 15SB from the upper order bits La of the L-channel, while taking out bits 16SB to 22SB, 23SB and 24SB, from the lower order bits Lb of the L-channel. The bits from MSB to 15SB and 16SB to 22SB, 23SB and 24SB make up 24 bits of the audio data. The second decoding circuit 23 combine these bits to form 24-bit audio data L0 of the L-channel to output the data L0.

In the present embodiment, the discrimination bits dl1, dl2, dr1, dr2 are appended during recording for discriminating the upper and lower order bits. When performing the above decoding, the first decoding circuit 22 or the second decoding circuit 23 refers to these discrimination bits dl1 to dr2 for correctly discriminating the upper and lower order bits.

By referring to these discrimination bits dl1 to dr2, the upper and lower bits can be discriminated correctly from each other for correct decoding even if the lower order bits are presented by error where the upper order bits should be presented. Therefore, even if the lower order bits are presented by error where the upper order bits should be presented, the normal sound can be reproduced at all times without the risk of emitting strange sounds due to incorrect decoding.

Meanwhile, there are occasions wherein, if the reproduction is going on with the relative speed of movement between the magnetic tape and the magnetic head deviated from the normal reproducing speed, by way of performing variable speed reproduction, tape running control by the servo system of the tape running device should fail to operate as normally, with the magnetic head then scanning the slanted track having recorded thereon data corresponding to the lower order bits without scanning the slanted track having recorded thereon data corresponding to the upper order bits. The slanted track having recorded thereon data corresponding to the upper order bits corresponds to the third slanted track T3 or to the fourth slanted track T4 in FIG. 7, while the slanted track having recorded thereon data corresponding to the lower order bits corresponds to the first slanted track T1 or to the second slanted track T2 in FIG. 7.

In the present embodiment, part of the upper order bits is duplicated and appended to the lower order bits during recording, as explained previously. If the magnetic head scans the slanted track having recorded thereon data corresponding to the lower order bits during variable speed reproduction, the playback output is obtained on the basis of the data corresponding to the part of the upper order bits recorded on the slanted track. This produces a sufficient playback output even if the tape running control falls into disorder during variable speed reproduction such that the magnetic head scans the slanted track having recorded thereon data corresponding to the lower order bits.

Meanwhile, it is the upper 6 bits from MSB to 6SB of the original 24 bit audio data that is duplicated and appended to the lower order bits. Therefore, if the magnetic head scans the slanted track having recorded thereon data corresponding to the lower order bits, it is possible to produce the playback output for the upper six bits. The playback output obtained by the upper six bits is sufficient for the objective of reproducing the monitor sound during variable speed reproduction for locating the position a particular sound.

In the present embodiment, upper 6 bits of from MSB to 16SB, among the 24-bits making up the audio signals, are arrayed in the upper 6 bits of the upper bits Ra and La and in the upper 6 bits of the lower bits Rb and Lb, as shown in FIG. 7. Thus, by reproducing the upper order 6 bits, the playback output for upper 6 bits from MSB to 16SB of the bits making up the 24-bit audio data can be obtained in any case without the necessity of discriminating whether the reproduced data is the data corresponding to the upper order bits Ra or La or data corresponding to the lower order bits Rb or Lb. That is, in the present embodiment, the playback output for the upper 6 bits can be obtained even if it becomes impossible during variable speed reproduction to discriminate whether the playback data is the data corresponding to the upper bits or data corresponding to the lower bits. The playback output, obtained by the upper 6 bits, is sufficient for the objective of reproducing the monitor sound during variable speed reproduction for locating the position of the particular sound, as explained previously.

What is claimed is:

1. A digital signal recording apparatus employing a tape-shaped recording medium having formed thereon a plurality of slanted tracks corresponding to digital information signals formed of left channel audio data and right channel audio data, comprising:

a signal processing unit for separating each of said left channel audio data and said right channel audio data, respectively, into a first portion and a second portion, for separating each said second portion into upper order bits of the second portion and into lower order bits of the second portion, and for duplicating upper order bits of the first portion and appending the duplicated upper order bits to the lower order bits of the second portion; and a recording unit for recording an output of said signal processing unit on the tape-shaped recording medium, said recording unit having a rotary drum and at least one head mounted on said rotary drum, said recording unit causing said at least one head to record the first portion, the upper order bits of the second portion, and the duplicated upper order bits appended to the lower order bits of the second portion from said signal processing unit in different respective tracks.

2. The digital signal recording apparatus as claimed in claim 1 wherein said signal processing unit when separating each of the left channel audio data and the right channel audio data, respectively, into the first and second portions appends a discrimination code for discriminating the upper order bits and the lower order bits from each other.

3. The digital signal recording apparatus as claimed in claim 2 wherein said signal processing unit generates for each of said left channel audio data and said right channel audio data, respectively, a further portion made up of lower order bits of said first portion and said lower order bits of said second portion, said recording unit causing said at least one head to record said first portion, said upper order bits of the second portion, and the further portion from said recording unit in different respective tracks on the tape-shaped recording medium.

4. The digital signal recording apparatus as claimed in claim 2 wherein said signal processing unit includes an encoder for separating each of said left channel audio data and said right channel audio data, respectively, into said first portion, said second portion, said upper order bits and said lower order bits of each said second portion and for generating said discrimination code, and a memory for recording an output of said encoder.

5. The digital signal recording apparatus as claimed in claim 4 wherein said signal processing unit includes an address generating unit for generating a write address and a readout address based on an interleaving period and a sampling word period used in said recording unit.

6. The digital signal recording apparatus as claimed in claim 5 wherein the memory has a readout speed based on readout addresses generated by said address generating unit which is faster than a write speed based on the write address generated by said address generating unit.

* * * * *